United States Patent
Wang et al.

(10) Patent No.: US 9,191,069 B2
(45) Date of Patent: Nov. 17, 2015

(54) POWER LINE COMMUNICATIONS SYSTEM AND METHOD

(71) Applicants: STATE GRID CORPORATION OF CHINA (SGCC), Beijing (CN); STATE GRID CHONGQING ELECTRIC POWER CO. ELECTRIC POWER RESEARCH INSTITUTE, Chongqing (CN)

(72) Inventors: Yi Wang, Chongqing (CN); Guojun He, Chongqing (CN); Hongliang Sun, Chongqing (CN); Xingzhe Hou, Chongqing (CN); Yongxiang Liu, Chongqing (CN); Jing Ji, Chongqing (CN); Xiaorui Hu, Chongqing (CN)

(73) Assignees: STATE GRID CORPORATION OF CHINA (SGCC), Beijing (CN); STATE GRID CHONGQING ELECTRIC POWER CO. ELECTRIC POWER RESEARCH INSTITUTE, Chongqing (CN)

( * ) Notice: Subject to any disclaimer, the term of this patent is extended or adjusted under 35 U.S.C. 154(b) by 0 days.

(21) Appl. No.: 14/373,582

(22) PCT Filed: Sep. 2, 2013

(86) PCT No.: PCT/CN2013/082783
§ 371 (c)(1),
(2) Date: Jul. 21, 2014

(87) PCT Pub. No.: WO2014/036916
PCT Pub. Date: Mar. 13, 2014

(65) Prior Publication Data
US 2015/0171921 A1 Jun. 18, 2015

(30) Foreign Application Priority Data
Sep. 5, 2012 (CN) .......................... 2012 1 0325821

(51) Int. Cl.
*H04B 7/02* (2006.01)
*H04L 1/02* (2006.01)
(Continued)

(52) U.S. Cl.
CPC ................. *H04B 3/54* (2013.01); *H04W 88/08* (2013.01); *H04B 2203/5441* (2013.01)

(58) Field of Classification Search
CPC .......... H04B 3/54; H04B 3/542; H04B 3/544; H04B 3/546; H04B 3/56; H04B 3/58; H04B 2203/5441; H04W 88/08; H04W 88/085; H04W 88/10
USPC ......... 375/257, 260, 267, 299, 347, 220, 219, 375/222; 455/7, 14; 370/252
See application file for complete search history.

(56) References Cited

U.S. PATENT DOCUMENTS 8,199,659 B2 * 6/2012 Mergler et al. ............... 370/252
8,442,127 B2 5/2013 Stadelmeier et al.
(Continued)

FOREIGN PATENT DOCUMENTS

CN 101106445 A 1/2008
CN 101620776 A 1/2010
(Continued)

OTHER PUBLICATIONS

International Search Report (English and Chinese) and Written Opinion of the ISA (Chinese) for PCT/CN2013/082783, ISA/CN, Beijing, mailed Dec. 5, 2013.

*Primary Examiner* — Phuong Phu
(74) *Attorney, Agent, or Firm* — Harness, Dickey & Pierce, P.L.C.

(57) ABSTRACT

The present application provides a power line communications system and method. The system comprises a power line network, a sending apparatus, and a receiving apparatus. The receiving apparatus comprises at least two PLC modems connected through a power line link. The sending apparatus sends a signal to a target PLC modem in the receiving apparatus through a power line network. The target PLC modem is at least one PLC modem in the receiving apparatus. The PLC modems in the receiving apparatus simultaneously receive a signal, the PLC modems except the target PLC modem respectively send the received signal to the target PLC modem through a wireless link, and the target PLC modem restores the signal sent by the sending apparatus according to the signal received through the power line network and the signal received through the wireless link. According to the power line communications system and method provided in the present application, the signal transmission quality is improved, and the data transmission rate and the system reliability are improved.

5 Claims, 3 Drawing Sheets

(51) Int. Cl.
*H04B 3/54* (2006.01)
*H04W 88/08* (2009.01)

(56) References Cited

U.S. PATENT DOCUMENTS

| | | |
|---|---|---|
| 2004/0077310 A1* | 4/2004 | Levy .................................. 455/7 |
| 2008/0068141 A1 | 3/2008 | Yokomitsu et al. |
| 2010/0061433 A1 | 3/2010 | Stadelmeier et al. |
| 2012/0161543 A1 | 6/2012 | Reuven et al. |
| 2012/0163435 A1 | 6/2012 | Reuven et al. |
| 2012/0163436 A1 | 6/2012 | Stadelmeier et al. |
| 2012/0177132 A1 | 7/2012 | Reuven et al. |
| 2012/0328030 A1 | 12/2012 | Stadelmeier et al. |

FOREIGN PATENT DOCUMENTS

| | | |
|---|---|---|
| CN | 101785203 A | 7/2010 |
| CN | 202352058 U | 7/2012 |
| CN | 102832971 A | 12/2012 |
| CN | 102832972 A | 12/2012 |
| WO | WO-2011001430 A2 | 1/2011 |

* cited by examiner

POWER LINE COMMUNICATIONS SYSTEM AND METHOD

This application is a Nation Stage application of PCT international application PCT/CN2013/082783, filed on Sep. 2, 2013 which claims priority to Chinese patent application No. 201210325821.3 titled "POWER LINE COMMUNICATION SYSTEM AND METHOD" and filed with the State Intellectual Property Office on Sep. 5, 2012, both of which are incorporated herein by reference in their entireties.

FIELD

The present disclosure relates to the field of communication technology, and in particular to a power line communication system and method.

BACKGROUND

Generally, there are three modes for accessing internet, i.e., a dial-up mode via a telephone line, a Cable Modem (CM) mode via a cable television line, and an Ethernet mode via a twisted pair. In a process of accessing internet in each of these modes, a special modem and an access port are required, which results in a high cost and inconvenience.

With a continuous development of power line communication technology, a high Internet connection speed of 4.5 Mbps to 45 Mbps can be provided to users, which allows the user to browse web pages, make calls and watch movies online. Therefore, networks of data, voice, video and power are integrated together. The full name of the power line communication is Power Line Carrier (PLC) communication, which refers to a special communication mode for transmitting voices or data by using a high voltage power line, a medium voltage power line or a low voltage distribution line as an information transmission medium.

During the implementation of the present disclosure, the inventors found that although the power line communication technology is continuously improved, a frequency selective fading due to a multi-path effect and a large-scale fading due to a line loss exist on a power line channel in the existing power line communication system. Thus, a channel between two PLC modems with a very short physical distance may be in a deep fading area. In addition, due to the large-scale fading, the signal between two PLC modems with a long distance has energy less than a minimum receiving threshold. Furthermore, various strong interferences exist on the power line channel. All these problems lead to a low signal transmission quality and a low system reliability of the existing power line communication system.

SUMMARY

In view of this, a power line communication system and a power line communication method are provided according to the present disclosure to solve the problem of the low signal transmission quality and the low system reliability of the existing power line communication system. The solution is as follows.

A power line communication system includes a power line network, a sending device and a receiving device, where the receiving device includes at least two PLC modems connected to each other through a power line link;

the sending device sends a signal to a target PLC modem in the receiving device, where the target PLC modem is at least one of the PLC modems in the receiving device;

all of the PLC modems in the receiving device receive the signal simultaneously;

each of the PLC modems other than the target PLC modem transmits the received signal to the target PLC modem through a wireless link; and the target PLC modem recovers the signal sent by the sending device, according to the signal received by the target PLC modem through the power line network and the signal received by the target PLC modem through the wireless link.

The receiving device includes at least two PLC modems connected to each other through a power line link; and all of the PLC modems in the sending device send the signals to the receiving device simultaneously.

A power line coupling unit is configured to couple the signal transmitted through the power line network. A wireless interface is configured to receive the signal transmitted through the wireless link. A PLC processing unit is configured to perform a combining process on the signal coupled by the power line coupling unit and the signal received through the wireless interface.

The wireless interface is a Bluetooth interface, a wireless local area network (WLAN) interface or a wireless MESH network interface.

The power line network is a low voltage power line network, a medium voltage power line network, or a high voltage power line network.

A power line communication method is provided, which is applied to a power line communication system including a power line network, a sending device and a receiving device, where the receiving device includes at least two PLC modems connected to each other through a power line link. The method includes:

sending, by the sending device, a signal to a target PLC modem in the receiving device, where the target PLC modem is at least one of the PLC modems in the receiving device;

receiving the signal simultaneously by all of the PLC modems in the receiving device;

transmitting, by each of the PLC modems other than the target PLC modem, the received signal to the target PLC modem through a wireless link; and recovering, by the target PLC modem, the signal sent by the sending device, according to the signal received by the target PLC modem through the power line network and the signal received by the target PLC modem through the wireless link.

In the power line communication system and method according to the present disclosure, multiple PLC modems in the receiving device are connected to each other through a power line link by using the MIMO (Multiple Input, Multiple Output) technology, and information interaction is performed among PLC modems through a wireless link in conjunction with the wireless communication technology. In this way, the multiple PLC modems form a virtual power line MIMO system. By combining the power line communication and the wireless communication, the signal transmission quality is improved, and the data transmission rate and the system reliability are improved.

DETAILED DESCRIPTION

To further understand the present disclosure, a preferred solution of the present disclosure is described with an embodiment. It will be understood that the description herein is only to explain the feature and advantage of the present disclosure, and is not a limit to the claims of the present disclosure.

Figure 1:
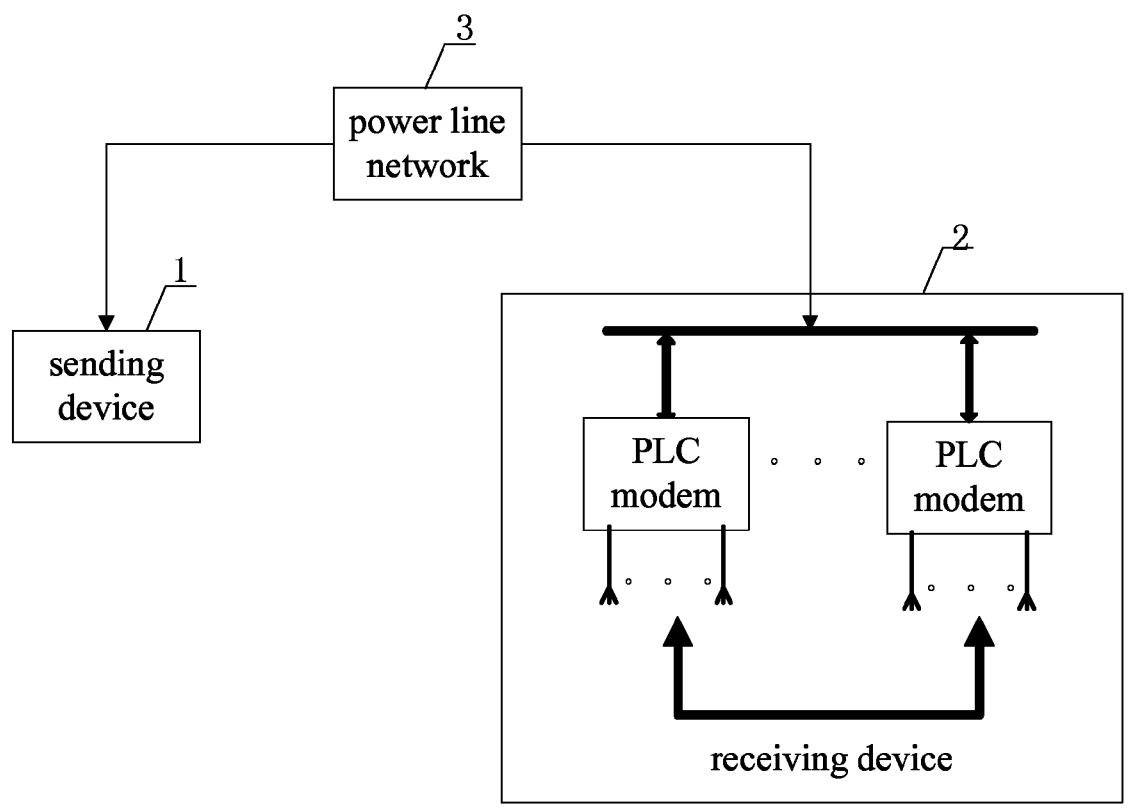
FIG. 1 is a structural schematic diagram of a power line communication system according to an embodiment of the present disclosure.

A power line communication system is provided according to an embodiment of the present disclosure. FIG. 1 is a structural schematic diagram of the system.

The system may include: a sending device 1, a receiving device 2 and a power line network 3. The receiving device 2 includes at least two PLC modems connected to each other through a power line link.

The sending device 1 sends a signal to a target PLC modem in the receiving device 2 through the power line network 3. All of the PLC modems in the receiving device 2 receive the signal simultaneously. Each of the PLC modems other than the target PLC modem transmits the received signal to the target PLC modem through a wireless link. The target PLC modem recovers the signal sent by the sending device according to the signal received by the target PLC modem through the power line network and the signal received by the target PLC modem through the wireless link. The target PLC modem is at least one of the PLC modems in the receiving device 2, which is configured to receive the signal.

A power line communication method is provided according to an embodiment of the present disclosure. The method is applied to a power line communication system including a sending device, a receiving device and a power line network. The receiving device includes at least two PLC modems connected to each other through a power line link. The method may include Step S1 to Step S4.

In Step S1, the sending device sends a signal to a target PLC modem in the receiving device. The target PLC modem is at least one of the PLC modems in the receiving device, which is configured to receive the signal.

In Step S2, the PLC modems in the receiving device receive simultaneously the signal.

In Step S3, each of the PLC modems other than the target PLC modem transmits the received signal to the target PLC modem through a wireless link.

In Step S4, the target PLC modem recovers the signal sent by the sending device according to the signal received by the target PLC modem through the power line network and the signal received by the target PLC modem through the wireless link.

In the power line communication system and method according to the embodiments of the present disclosure, multiple PLC modems in the receiving device are connected to each other through a power line link by using the MIMO (Multiple Input, Multiple Output) technology, and information interaction is performed among PLC modems through a wireless link in conjunction with the wireless communication technology. In this way, the multiple PLC modems form a virtual power line MIMO system. By combining the power line communication and the wireless communication, the signal transmission quality is improved, and the data transmission rate and the system reliability are improved.

First Embodiment

Figure 2:
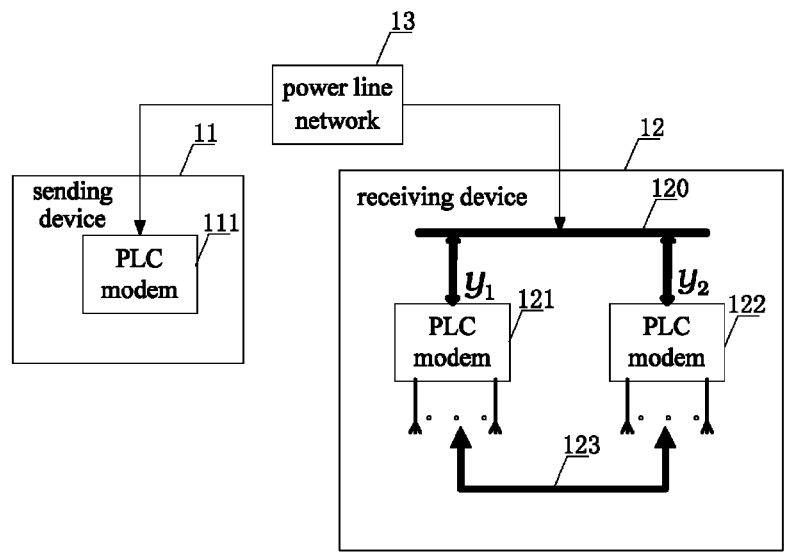
FIG. 2 is a structural schematic diagram of a power line communication system according to a first embodiment of the present disclosure.
Figure 3:
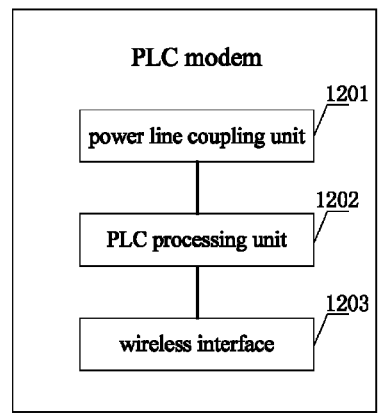
FIG. 3 is a structural schematic diagram of a PLC modem in a receiving device according to the first embodiment of the present disclosure.

A power line communication system is provided according to a first embodiment of the present disclosure. FIG. 2 is a structural schematic diagram of the system. The system may include a sending device 11, a receiving device 12 and a power line network 13. The sending device 11 includes a PLC modem 111. The receiving device 12 includes a PLC modem 121 and a PLC modem 122. The PLC modem 121 and the PLC modem 122 are connected to each other through a power line link 120.

In the embodiment, each PLC modem in the receiving device 12 includes a power line coupling unit 1201, a PLC processing unit 1202 and a wireless interface 1203. The power line coupling unit 1201 is configured to couple the signal sent through the power line network 3. The wireless interface 1203 is configured to receive the signal transmitted through a wireless link. The PLC processing unit 1202 is configured to perform a combining process on the signal coupled by the power line coupling unit 1201 and the signal received through the wireless interface 1203; and finally send the processed signal to a user terminal. The combining process may be for example a maximal ratio combining, an equal gain combining and a selection combining. The wireless interface 1203 in the embodiment may be a Bluetooth interface, a wireless local area network (WLAN) interface or a wireless MESH network interface.

The PLC modem 111 of the sending device 11 sends a signal x to one PLC modem in the receiving device 12 through the power line network 13. In the present embodiment, it is assumed that the signal x is sent to the PLC modem 121. That is, the PLC modem 121 is the target PLC modem which is configured to receive the signal.

The PLC modem 121 and the PLC modem 122 in the receiving device 12 receive simultaneously the signal sent through the power line network 13. The signal received by the PLC modem 121 is $y_1$, and the signal received by the PLC modem 122 is $y_2$. Assuming that the system function of a power line channel for receiving the signal x in the PLC modem 121 is $h_1$ and a system function of a power line channel for receiving the signal x in the PLC modem 122 is $h_2$, the signals $y_1$ and $y_2$ are expressed as $y_1 = x \cdot h_1$, and $y_2 = x \cdot h_2$, respectively.

The PLC modem 122 and the PLC modem 121 are connected through a wireless link 123. The received signal $y_2$ is transmitted to the PLC modem 121 through the wireless link 123. The PLC modem 121 recovers the original signal x according to the received signals $y_1$ and $y_2$. In the embodiment, the PLC modem 121 recovers the original signal x by calculating signal-to-noise ratios of the signals $y_1$ and $y_2$ and using the method of the maximal ratio combining.

Furthermore, in the embodiment, the power line network 13 may be a low voltage power line network, such as a low voltage power line network of 220V, which will not be limited by the embodiments. The power line network 13 may further be a medium voltage power line network or a high voltage power line network.

In the power line communication system and method according to the first embodiment of the present disclosure, multiple PLC modems in the receiving device are connected to each other through a power line link by using the MIMO (Multiple Input, Multiple Output) technology, and information interaction is performed among PLC modems through a wireless link in conjunction with the wireless communication technology. In this way, the multiple PLC modems form a virtual power line MIMO system. By combining the power line communication and the wireless communication, the signal transmission quality is improved, and the data transmission rate and the system reliability are improved.

Second Embodiment

Figure 4:
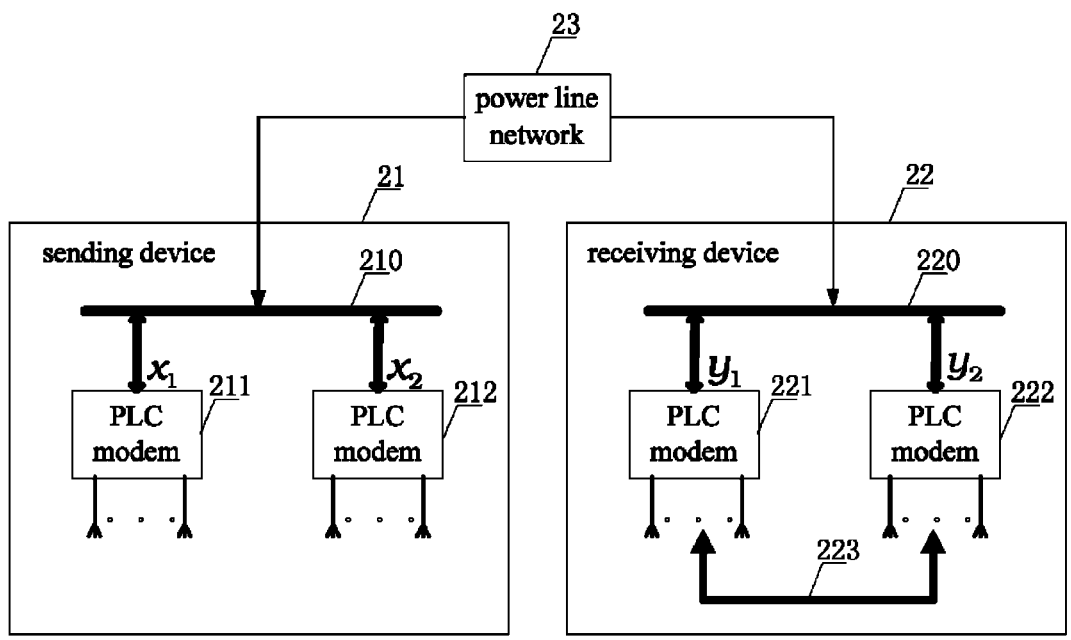
FIG. 4 is a structural schematic diagram of a power line communication system according to a second embodiment of the present disclosure.

A power line communication system is provided according to a second embodiment of the present disclosure. FIG. 4 is a structural schematic diagram of the system. The system may include a sending device 21, a receiving device 22 and a power line network 23. The sending device 21 includes a PLC modem 211 and a PLC modem 212, which are connected to each other through a power line link 210. The receiving device 22 includes a PLC modem 221 and a PLC modem 222, which are connected to each other through a power line link 220.

The PLC modem 211 and the PLC modem 212 of the sending device 21 send simultaneously a signal to one PLC modem in the receiving device 22. It is assumed that the signal sent by the PLC modem 211 is $x_1$, and the signal sent by the PLC modem 212 is $x_2$. In the embodiment, assuming that the signals $x_1$ and $x_2$ are sent to the PLC modem 221. That is, the PLC modem 221 is the target PLC modem which is configured to receive the signal.

The PLC modem 221 and the PLC modem 222 in the receiving device 22 receive simultaneously the signal transmitted through the power line network 23. The signal received by the PLC modem 221 is $y_1$, and the signal received by the PLC modem 222 is $y_2$. Assuming that a system function of a power line channel between the PLC modem 211 and the PLC modem 221 is $h_{11}$, a system function of a power line channel between the PLC modem 211 and the PLC modem 222 is $h_{12}$, a system function of a power line channel between the PLC modem 212 and the PLC modem 221 is $h_{21}$, and a system function of a power line channel between the PLC modem 212 and the PLC modem 222 is $h_{22}$, the signals $y_1$ and $y_2$ are expressed as $y_1 = x_1 \cdot h_{11} + x_2 \cdot h_{21}$, and $y_2 = x_1 \cdot h_{21} + x_2 \cdot h_{22}$, respectively.

The PLC modem 222 and the PLC modem 221 are connected through a wireless link 223. The received signal $y_2$ is transmitted to the PLC modem 221 through the wireless link 223. The PLC modem 221 recovers the original signals $x_1$ and $x_2$ according to the received signals $y_1$ and $y_2$. In the embodiment, the PLC modem 221 recovers the original signals $x_1$ and $x_2$ by calculating signal-to-noise ratios of the signals $y_1$ and $y_2$ and using the method of the maximal ratio combining. In the embodiment, the original signals $x_1$ and $x_2$ may be recovered by using ZF (zero-forcing) detection algorithm of V-BLAST detection technology.

Furthermore, in the embodiment, the power line network 23 may be a low voltage power line network, such as a low voltage power line network of 220V, which will not limited by the embodiments. The power line network 23 may further be a medium voltage power line network or a high voltage power line network.

In the power line communication system and method according to the second embodiment of the present disclosure, multiple PLC modems in the receiving device are connected to each other through a power line link by using the MIMO (Multiple Input, Multiple Output) technology, and information interaction is performed among PLC modems through a wireless link in conjunction with the wireless communication technology. In this way, the multiple PLC modems form a virtual power line MIMO system. By combining the power line communication and the wireless communication, the signal transmission quality is improved, and the data transmission rate and the system reliability are improved.

Those skilled in the art may implement or use the present disclosure according to the description of the embodiment herein. Numerous modifications to the embodiments will be apparent to those skilled in the art, and the general principle herein can be implemented in other embodiments without deviation from the spirit or scope of the present disclosure. Therefore, the present disclosure will not be limited to the embodiments described herein, but in accordance with the widest scope consistent with the principles and novel features disclosed herein.

The invention claimed is:

1. A power line communication system, comprising a power line network, a sending device, and a receiving device, wherein:

the receiving device comprises at least two Power Line Carrier (PLC) modems connected to each other through a power line link;

the sending device sends a signal to a target PLC modem in the receiving device, wherein the target PLC modem is at least one of the PLC modems in the receiving device;

all of the PLC modems in the receiving device receive the signal simultaneously;

each of the PLC modems other than the target PLC modem transmits the received signal to the target PLC modem through a wireless link;

the target PLC modem recovers the signal sent by the sending device, according to the signal received by the target PLC modem through the power line network and the signal received by the target PLC modem through the wireless link;

the sending device comprises at least two PLC modems connected to each other through a power line link; and the at least two PLC modems in the sending device send the signal to the receiving device simultaneously.

2. The power line communication system according to claim 1, wherein each of the PLC modems of the receiving device comprises a power line coupling unit, a PLC processing unit, and a wireless interface, wherein the power line coupling unit is configured to couple the signal transmitted through the power line network, the wireless interface is configured to receive the signal transmitted through the wireless link, and the PLC processing unit is configured to perform a combining process on the signal coupled by the power line coupling unit and the signal received through the wireless interface.

3. The power line communication system according to claim 2, wherein the wireless interface is a Bluetooth interface, a wireless local area network (WLAN) interface, or a wireless MESH network interface.

4. The power line communication system according to claim 1, wherein the power line network is a low voltage power line network, a medium voltage power line network, or a high voltage power line network.

5. A power line communication method, applied to a power line communication system comprising a power line network, a sending device and a receiving device, wherein the receiving device comprises at least two PLC modems connected to each other through a power line link, the sending device comprises at least two PLC modems connected to each other through a power line link, and the method comprises:

sending, by the sending device, a signal to a target PLC modem in the receiving device, wherein the target PLC modem is at least one of the PLC modems in the receiving device, and wherein the at least two PLC modems in the sending device send the signal to the receiving device simultaneously;

receiving the signal simultaneously by all of the PLC modems in the receiving device;

transmitting, by each of the PLC modems other than the target PLC modem, the received signal to the target PLC modem through a wireless link; and recovering, by the target PLC modem, the signal sent by the sending device, according to the signal received by the target PLC modem through the power line network and the signal received by the target PLC modem through the wireless link.

\* \* \* \* \*